(No Model.)
J. D. ENAS.
WAX EXTRACTOR.
No. 308,958. Patented Dec. 9, 1884.
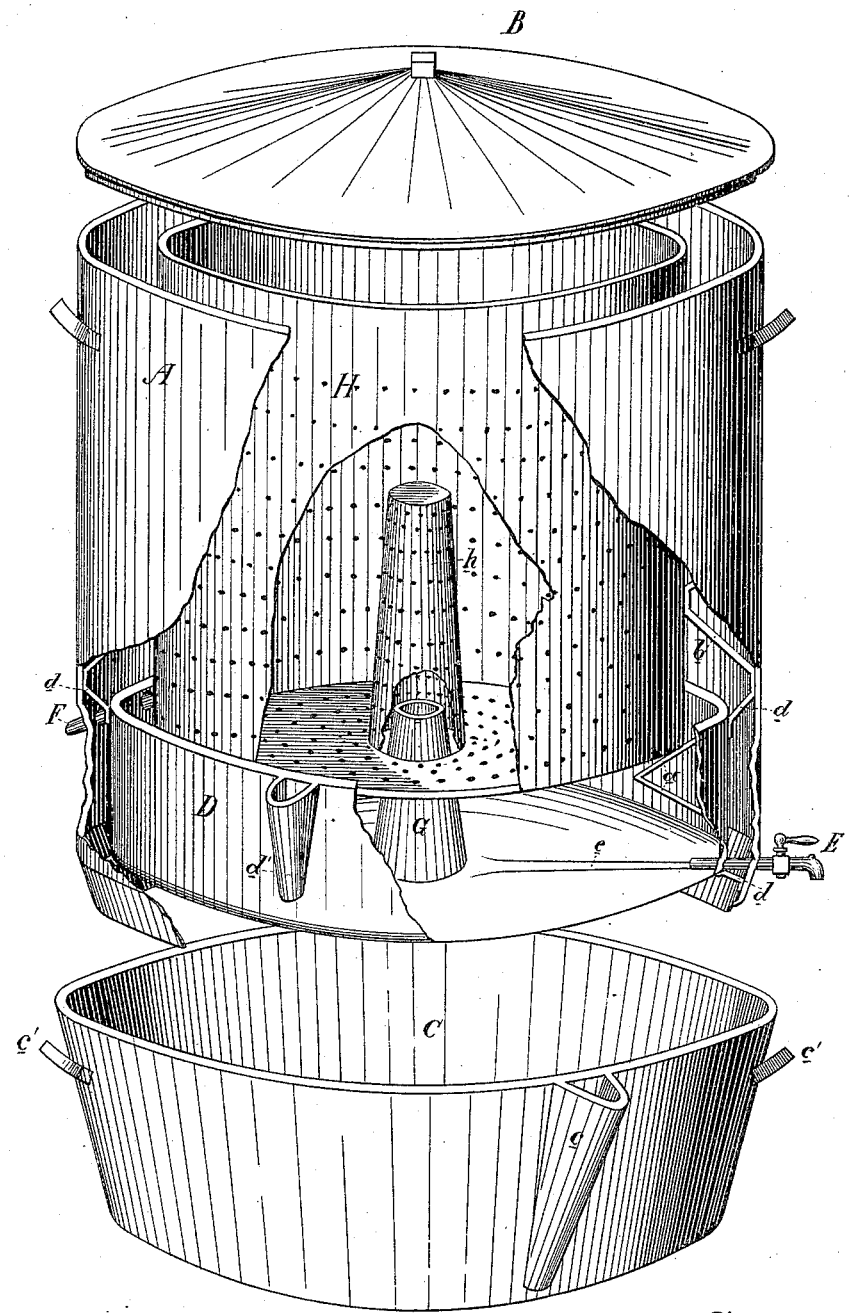
Witnesses,
Geo. H. Strong
J. F. House
Inventor,
J. D. Enas
By
Dewey & Co.
Attorneys

UNITED STATES PATENT OFFICE.

JOSEPH D. ENAS, OF NAPA CITY, CALIFORNIA.

WAX-EXTRACTOR.

SPECIFICATION forming part of Letters Patent No. 308,958, dated December 9, 1884.

Application filed June 2, 1884. (No model.)

*To all whom it may concern:*

Be it known that I, JOSEPH D. ENAS, of Napa City, county of Napa, and State of California, have invented an Improvement in Wax-Extractors; and I hereby declare the following to be a full, clear, and exact description thereof.

My invention relates to a new and useful wax-extractor of that class in which the combs are confined within a foraminous vessel encircled by a suitable steam-jacket, and having a central passage by which steam is admitted to the center of the mass of combs; and my invention consists in an underlying body of water into which the melted material drips, and from the surface of which the wax is allowed to overflow, while the sediment is drained off from below.

It consists, further, in the peculiar arrangement and construction of vessels and details, which I shall hereinafter fully explain.

The object of my invention is to provide a simple, effective, and easily-operated device for extracting the wax from honey-combs.

Referring to the accompanying drawing, the figure represents a wax-extractor with my improvements attached.

A is a bottomless vessel provided with a removable cover or lid, B.

C is a kettle, in the top of which the lower portion of vessel A rests. The kettle is provided with a feed-spout, c, through which it is supplied with water, and it is intended to be placed upon a stove or other suitable source of heat. It has handles c', for convenience in moving it, and the vessel A has handles also, for a similar purpose.

Within the vessel A, near its bottom or lower portion, is a pan, D, supported therein by suitable bracket-arms, d, connected with its rim and with the interior surface of vessel A. The rim of pan D is provided with a feed spout or lip, d', projecting through the side of vessel A. The bottom of the pan is concaved, with the exception of a narrow gutter-way, e, which has a downward slope from near the center to rim, and has communicating with it a faucet, E, whereby the entire pan may be drained. At another portion of the pan D is an overflow-spout, F, to draw off from the surface of the liquid in the pan. At the center of the pan is a hollow truncated open-ended cone, G, the lower end of which communicates directly with the kettle.

H is a vessel having a foraminous bottom and circumference or sides, the perforations, however, in the sides extending not quite to the top, leaving an unperforated annular space or band at the top, as shown.

From the center of the bottom of the foraminous vessel H extends upwardly a hollow truncated cone, h, having a height of about one-half (more or less) of the vessel H. The upper end of the cone is closed, though its lower end is open by reason of a hole made under it in the bottom of vessel H. The sides of the cone are perforated around its entire circumference. This vessel H is fitted within the vessel A, its bottom extending down a short distance into the top of the pan D, in which it is supported by angular bracket-arms a, the upper ends of which are secured to the interior surface of the vessel A, their lower ends being secured to the interior surface of the rim of pan D. It is further steadied in position by short arms b, extending from its sides higher up and bearing against the inner surface of the vessel A. The diameter of the pan D is enough less than that of the vessel A to leave a space, as shown, between them, and is enough greater than that of the foraminous vessel H to enable it to catch the drippings from the sides of said vessel. The cone G of pan D projects upward in the cone of vessel H.

The use of this device or apparatus is as follows: Water is put in the kettle, and also in the pan D, and the honey-combs are put in the vessel H. Heat is applied to the kettle, and the steam generated from its water rises through the open bottom of vessel A, and through the annular space between said vessel and pan D, and, entering the foraminous sides of the vessel H, melts the combs. It also rises through the hollow cone G of pan D into the hollow cone h of vessel H, through the perforated sides of which it passes, melting the center of the mass of combs. The melted material sinks down through the perforated bottom of vessel H, and out of its sides into the underlying body of water in pan D. The purer portion or wax of the melted material floats on the top of the water and overflows through the spout F, while the impure portions sink to the bottom of the pan as sediment, and are drawn off when the water is drained through the faucet E.

The object in having the perforated cone $h$ extend but a part of the distance through the combs is that the steam which is directed from its sides may affect not only material around the cone, but that above it as well.

By means of the feed spout or lip $d'$ the pan D may be supplied with fresh water without having to remove it, and the height of the water in the pan may readily be seen by its height in the feed-spout.

Having thus described my invention, what I claim as new, and desire to secure by Letters Patent, is—

1. In a wax-extractor in which the combs are subjected to the action of steam, an underlying body of water into which the melted material drips, and suitable means for drawing off the wax from the surface of the water, substantially as herein described.

2. In a wax-extractor in which the combs are subjected to the action of steam, an underlying body of water into which the melted material drips, a means for allowing the floating wax to overflow from the surface of the water, and a means for drawing off the water and sediment, substantially as herein described.

3. In a wax-extractor, and in combination with a comb-containing foraminous vessel surrounded by a suitable steam-jacket, a pan for water under said vessel, and adapted to receive the melted material therefrom, substantially as herein described.

4. In a wax-extractor, and in combination with a comb-containing foraminous vessel surrounded by a suitable steam-jacket, a pan for water under said vessel, and adapted to receive the melted material therefrom, said pan having an overflow pipe or spout and a drain pipe or faucet, substantially as herein described.

5. In a wax-extractor having a comb-containing foraminous vessel surrounded by a steam-jacket, a pan for water under said vessel, and adapted to receive the melted material therefrom, said pan having an overflow pipe or spout, a concave bottom, and a pipe or faucet to drain the pan, substantially as herein described.

6. In a wax-extractor, the exterior covered bottomless vessel, A, steam-generating kettle C, and the comb-containing foraminous vessel H within the exterior vessel, and having a space between it and said vessel for the steam, in combination with the water-pan D within vessel A and under vessel H, said pan having a diameter smaller than that of A, whereby a passage is left for the steam, and larger than that of H, whereby it catches the drippings from its sides, substantially as described.

7. In a wax-extractor, the exterior vessel, A, kettle C, and foraminous vessel H, in combination with the water-pan D within vessel A, having a hollow open-ended central cone, G, by which the steam is directed from the kettle into the vessel H, substantially as herein described.

8. In a wax-extractor, the comb-containing foraminous vessel H, having an encircling steam-jacket, and a central hollow cone, $h$, with a closed top and foraminous sides, for the admission of steam, said cone extending but a part way upward in said vessel, substantially as and for the purpose described.

9. In a wax-extractor, the vessel A, kettle C, and foraminous vessel H, having the hollow cone $h$, with perforated sides, in combination with the water-pan D under vessel H, and having the central hollow open-ended cone, G, extending upward into cone $h$, substantially as and for the purpose herein described.

10. A wax-extractor consisting of the covered bottomless vessel A, the steam-generating kettle C, into which it fits, the foraminous vessel H for the combs, having a central perforated hollow cone, $h$, and the water-pan D, having a central open-ended hollow cone, G, a feed spout or lip, $d'$, an overflow-spout, F, and a drain-faucet, E, all arranged substantially as and for the purpose herein described.

In witness whereof I have hereunto set my hand.

JOSEPH D. ENAS.

Witnesses:
S. H. NOURSE,
C. D. COLE.